March 16, 1926.
G. SCHUSTARICH
PRECISION MEASURING INSTRUMENT
Filed June 11, 1924
1,576,797
3 Sheets-Sheet 1
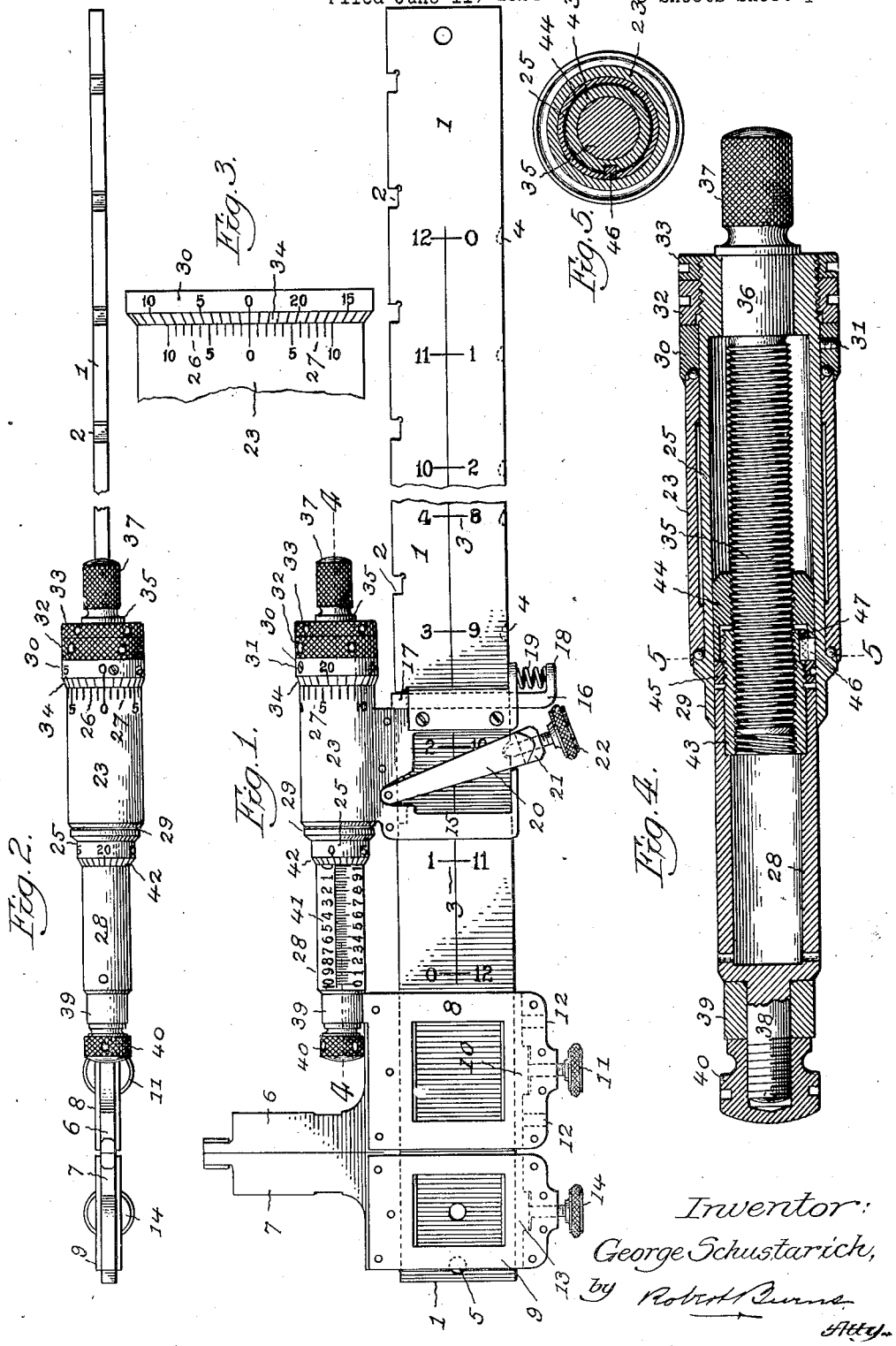
Inventor:
George Schustarich,
by Robert Burns
Atty.

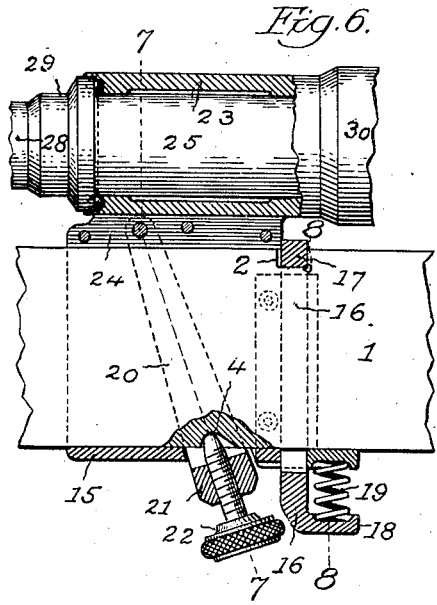
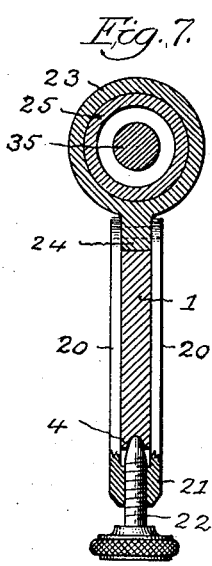
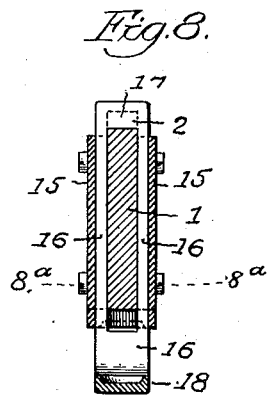
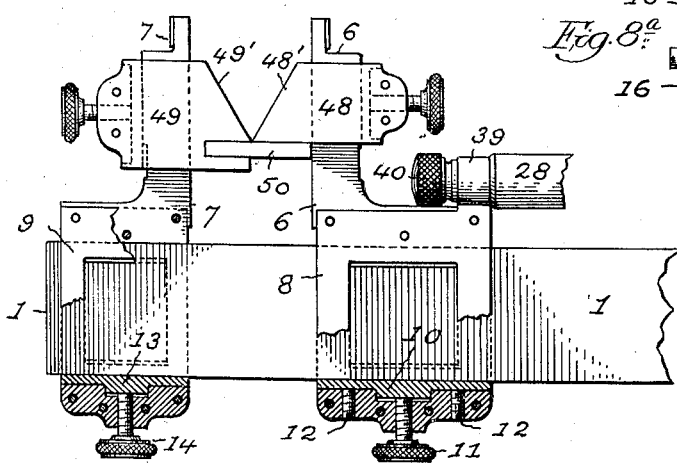
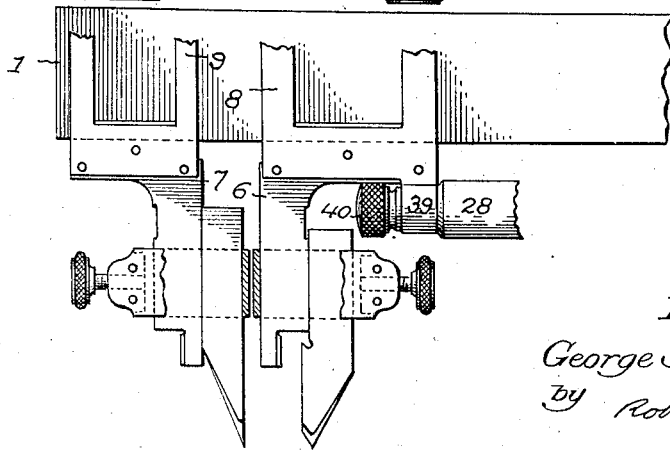

March 16, 1926.
G. SCHUSTARICH
PRECISION MEASURING INSTRUMENT
Filed June 11, 1924  3 Sheets-Sheet 3
1,576,797
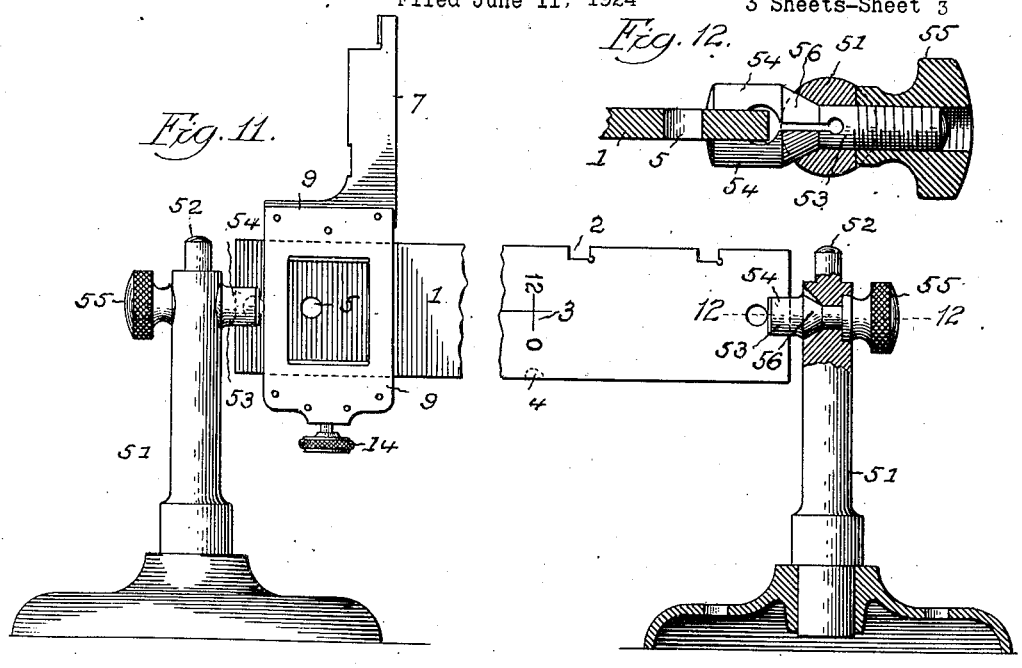
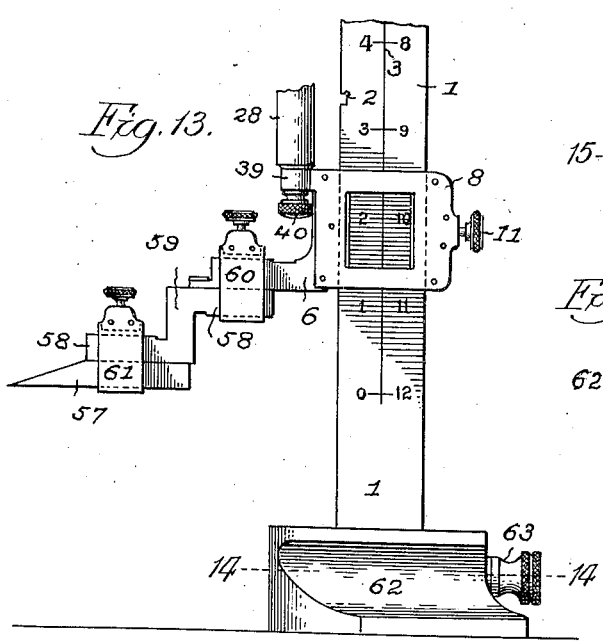
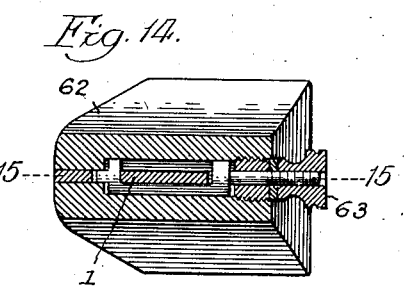
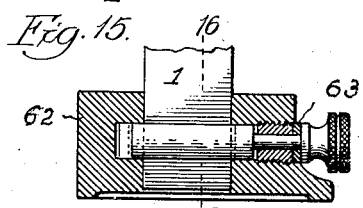
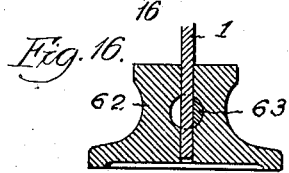
Inventor:
George Schustarich,
by Robert H Burns
Atty.

Patented Mar. 16, 1926.

1,576,797

UNITED STATES PATENT OFFICE.

GEORGE SCHUSTARICH, OF CHICAGO, ILLINOIS.

PRECISION MEASURING INSTRUMENT.

Application filed June 11, 1924. Serial No. 719,301.

*To all whom it may concern:*

Be it known that I, GEORGE SCHUSTARICH, a citizen of the United States of America, residing at Chicago, in the county of Cook and State of Illinois, have invented certain new and useful Improvements in Precision Measuring Instruments, of which the following is a specification.

This invention relates to that type of micrometer measuring instruments adapted for extended adjustments and with which interchangeable accessories are capable of ready attachment for use in taking measurements of different articles, and the invention more especially relates to the type of such instruments which constitutes the subject matter of my prior application for Letters Patent, Serial No. 431,983, filed December 20th, 1920. And the present improvements have as their various objects:—

To provide a structural formation and association of parts and mechanisms whereby rapid and accurate initial space adjustments between the measuring jaws of the instrument is attained, and with a relative large working capacity thereof.

To provide a combination of parts whereby the instrument is supported on a work bench or the like in a convenient manner for ready manual adjustments and visual reading of the measurements indicated on the scales of the instrument, the supporting means providing for a turning of the instrument as a whole to attain such readings.

To provide a structural arrangement of the carrying heads of the measuring jaws of the instrument, whereby an initial adjustment of the normally stationary carrying head is made to compensate for the aggregate thickness of the measuring jaws, when the instrument is employed in taking internal measurements, with the micrometer scales of the jaws accurately indicating the amount of the thickness of said jaws.

To provide a simple and compact arrangement of means for taking up wear or play between the screw threads of the micrometer adjusting mechanism, all as will hereinafter more fully appear.

In the accompanying drawing:—

Fig. 1, is a side elevation of the instrument with the parts set for outside measurements and with the jaws and associated parts at the zero point.

Fig. 2, is a top view of the same.

Fig. 3, is a fragmentary detail elevation of the Vernier scale between the rotatable and non-rotatable members of the micrometer mechanism of the instrument.

Fig. 4, is a detail longitudinal section of the preferred form of the micrometer mechanism of the instrument.

Fig. 5, is a transverse section on line 5.—5. Fig. 4.

Fig. 6, is a detail side elevation, with parts broken away and in section, of the adjustable carriage of the micrometer mechanism, and its means of attachment in an adjustable manner to the main carrying staff or rail of the instrument.

Fig. 7, is a detail transverse section on line 7.—7. Fig. 6.

Fig. 8, is a similar view on line 8.—8. Fig. 6.

Fig. 8ª, is a detail horizontal section on line 8ª.—8ª Fig. 8.

Fig. 9, is a detail side elevation showing the measuring jaws of the instrument provided with accessories adapted for gauging cutters used in cutting screw threads.

Fig. 10, is a similar view showing the measuring jaws provided with accessories adapting the instrument for use as a scriber and a divider.

Fig. 11, is a detail side elevation showing the instrument with accessories adapting the same for use as a bench appliance in taking inside and outside measurements.

Fig. 12, is a detail horizontal section on line 12.—12. Fig. 11.

Fig. 13, is a detail side elevation showing the instrument with accessories adapting the same for use as a height gauge.

Fig. 14, is a detail horizontal section of the supporting base, on line 14,—14, Fig. 13.

Fig. 15, is a longitudinal section of the same on line 15.—15. Fig. 14.

Fig. 16, is a transverse section on line 16.—16, Fig. 15.

Like reference numerals indicate like parts in the several views.

As represented in the drawings, the carrying staff or rail 1 of the instrument is preferably of a flat rectangular form throughout its length, and in the present improvement is formed with a series of abutment recesses 2 in one edge, spaced equidistantly from each other, with a scale or graduation 3, associated with the recesses 2, and with a series of companion socket recesses 4 in the edge opposite to that in which said abutment recesses 2 are formed.

The abutment recesses 2 are preferably of a rectangular form as shown, with their end walls remote from the measuring jaws of the instrument forming the active abutment faces of the respective recesses as hereinafter more fully described.

In addition the staff or rail 1 is formed with orifices 5 near its respective ends, for supporting engagement with upright pins on a pair of supporting pedestals, hereinafter described, when the instrument is used as a bench gauge.

The measuring jaws 6 and 7 are preferably of the right-angle form shown, and are fixedly secured to their individual carriages 8 and 9 formed to fit and encompass the staff or rail 1 and have adjustment along the same. In the construction shown in Figs. 1, 9, 10 and 13, the measuring jaw 6 and its carriage 8 constitutes the travelling or adjustable measuring member of the instrument and to such end said carriage 8 is formed for operative engagement with the micrometer adjusting mechanism hereinafter described. The companion measuring jaw 7 and its carriage 9 constitutes the stationary measuring member of the instrument and in the present improvement said carriage 9 is formed for rigid attachment to the staff or rail 1 in a manner to permit of an initial adjustment of the carriage 9 along the staff or rail 1 in some special uses of the instrument, as for instance, in setting the instrument for taking internal measurements and in order to effect an initial adjustment of the measuring jaws with relation to the scale 3 of the staff or rail 1, equal to and commensurate with the distance between remote contact surfaces of the measuring jaws when said jaws are in close contact with each other. In such initial adjusting operation the travelling measuring jaw 6 and its carriage 8 are adjusted along the staff or rail 1 from the zero marking of the scale 3 the distance between the aforesaid remote contact faces of the measuring jaws, after which the companion stationary jaw 7 and its carriage 9 are brought into close contact with said travelling jaw and carriage and then fixedly clamped upon the staff or rail 1. With the parts so adjusted the instrument in its further manipulations in taking internal measurements, etc. will give direct readings on the indicating scales of the instrument.

In the construction shown, a close and accurate sliding fit between the traveling jaw member and the staff or rail 1 aforesaid, is attained by means of an adjustable bearing bar 10 movable in the carriage 8 and an associated central operating screw 11 and a pair of side steadying screws 12, the action of which is to exert a stress against the wider edge of the staff or rail 1 to draw the extended angular bearing end of the measuring jaw 6 into close sliding contact with the upper edge of the staff or rail 1.

The stationary jaw member 7 and its carriage 9 are secured in a fixed and yet readily adjustable manner on the staff or rail 1 by a bearing bar 13 movable in the carriage 9 and a companion thumb screw 14, the action of which is against the under edge of the staff or rail 1 to draw the extended angular bearing end of the stationary jaw member 7 into close holding contact with the upper edge of the staff or rail aforesaid.

The carriage 15 of the micrometer adjusting mechanism of the instrument is of a sleeve like form similar to that of the carriages 8 and 9 of the measuring jaws, and is adapted to have a close sliding fit along the staff or rail 1, to which at stated distances it has holding engagement with any one of the abutment recesses 2 of the rail or staff 1 by means of a latch bar 16, which in the preferred form shown, is of a yoke shape and arranged to slide upon opposite sides of the staff on rail 1 and in a direction across the same. At one end the latch bar 16 is provided with a cross bar or detent 17, preferably rectangular in cross-section, and which is adapted for engagement in any one of the aforesaid abutment recesses 2 of the staff or rail 1. At its other end the latch bar 16 is formed with a lateral head or flange 18 for convenient manual actuation by a finger of the operator, while between said flange 18 and a bottom web of the carriage 15, is arranged a spring 19 the resilient tendency of which is to draw the cross bar 17 into one or the other of the abutment recess 2 with which it is brought into alignment.

Close and accurate contact between the aforesaid cross-bar or detent 17, and the remote wall of any one of the aforesaid abutment recesses 2, may be attained by any ordinary and suitable adjusting means between the carrriage 15 and the staff or rail 1. In the preferred construction shown more particularly in Figs. 1, 6 and 7, a stirrup frame 20 is pivoted at the upper ends of its side bars to the respective side webs of the longitudinal rib 24 of the headstock 23, while its lower transverse bar 21, is formed with a screw threaded orifice for the reception of a thumb screw 22, the point of which is adapted for abutting engagement with any one of the socket recesses 4 of the staff or rail 1 aforesaid.

The stirrup frame 20 is arranged to depend in an oblique direction to the carriage 15 and other parts of the instrument, and as so arranged, the thumb screw 22 when operated by hand is adapted to draw the carriage 15 and the hereinafter described housing of the micrometer mechanism, into accurate and fixed contact with the upper edge of the staff or rail 1 and simultaneously with such action to move the carriage longitudinally and bring the cross bar or detent 17 of the latch bar 16 aforesaid, into close and accurate contact with the remote wall of an abutment recess 2 in which it may be placed, and thus insure accurate register between the measuring face of the travelling jaw 6 and the scale 3 of the staff or rail 1.

The micrometer mechanism of the instrument comprises an outer tubular housing or headstock 23 having at one side a longitudinal rib 24 by which it is fixedly secured between the side walls of the carriage 15, with the lower face of the rib 24 having riding engagement on the upper edge of the staff or rail 1, as shown. The headstock 23 is of an open ended tubular form to provide bearings for the revoluble guide sleeve 25 of the mechanism, the journal bearing between the parts being of any usual formation by which revolution between the parts is attained and longitudinal play therebetween prevented. In this connection the ball type of bearings are preferred and to such end ball races are formed at the respective ends of the headstock 23, as shown.

Near the end remote from the measuring jaws 6, 7, the headstock 23 is formed with a circularly extending series of graduations, 26, 27 on its perimeter, constituting an element of a Vernier scale hereinafter described, and in the present improvement said graduations 26, 27, usually ten in number, have a duplex arrangement extending in opposite directions from a central zero graduation, as shown more particularly in Fig. 3.

The revoluble guide sleeve 25 above referred to, is also of a tubular form with its bore adapted to provide a guide for the longitudinally moving head or stem 28, which is fixedly attached to and has operative engagement with the travelling measuring jaw 6 of the instrument, as hereinafter described in detail. In the preferred form of the sleeve 25, the same is formed near one end with a fixed peripheral collar 29, which in turn is formed with a ball race to constitute a part of the ball bearing between the sleeve 25 and the headstock 23 aforesaid. Near its other end the sleeve 25 carries a loose collar 30, which is revolubly and longitudinally adjustable on the sleeve, and which in turn is formed with a ball race to constitute another part of the ball bearings between the sleeve 25 and headstock 23 aforesaid. A set screw 31 is associated with the collar 30 to clamp it at the proper period against independent revoluble movement on said sleeve while a longitudinal adjustment of said collar 30 is attained by an adjusting nut 32 and comparison locking nut 33 having screw threaded engagement with the correspondingly formed end of the sleeve 25, as shown more particularly in Fig. 4.

In the present improvement one end of the collar 30 is chamfered and formed with a peripheral graduation or scale 34, which in the construction shown will comprise twenty five divisions, which are adapted to register with the zero mark of the heretofore described duplex scales 26, 27, on the perimeter of the headstock 23 to afford measurements of one-thousandths of an inch when the hereinafter described micrometer screw 35 has forty screw threads to the inch. In the preferred form of the invention, the aforesaid Vernier scales 26, 27, will each contain ten graduations equal in extent to nine graduations of the aforesaid scale 34, and adapted in the same manner as the well known vernier construction, to afford measurements of one ten-thousandths of an inch, in a direct manner and whether the revoluble sleeve 25 is turned to the right or to the left in taking dimensions of an article.

The adjusting or micrometer screw 35 above referred to is arranged axially in the bore or cavity of the sleeve 25 aforesaid, and near one end is formed with a hub 36 adapted for a drive fit in a corresponding axial orifice in one end of said sleeve 25 to attain rotation in unison of said screw and sleeve, while at the end exterior of said sleeve, the screw 35 is preferably provided with a milled head 37 for convenient manual rotation in actual use.

The longitudinally moving head 28 heretofore referred to, is of a tubular form and has sliding and guiding movement in the cylindrical cavity or bore of the sleeve 25 aforesaid, with its tubular portion adapted to encircle the micrometer screw 35 and having screw threaded engagement therewith, preferably by means hereinafter described. The outer end of the head 28 is formed with a reduced shank or spindle 38 adapted to fit a receiving orifice in an integrally formed lug 39 on the travelling jaw 6 of the instrument, to which it is fixedly secured by a clamping nut 40 or other usual fastening means so as to be held from any turning movement during actual use of the instrument. The use of the clamping nut 40 is preferred as a means for securing the parts fixedly together, in that the hereinafter described turning adjustment of the said tubular head and its indicating scales can be effected before said nut is operated to effect the described fixed attachment of the parts.

In the present construction the visible portion of the tubular head 28, when fully extended, is formed with a longitudinal scale 41, which is preferably numbered in reverse directions so as to indicate in a direct manner, the extension of said head in taking one class of measurements, or the retraction of said head in taking another class of measurements. The longitudinal line of said scale 41 providing a zero mark for use in connection with a circular decimal or graduation 42, with which the adjacent chamfered end of the sleeve 25 is provided, and in order to provide readings of one-thousandth of an inch.

In that the scale 41, 42 just described and the scale 34, 26, 27 heretofore described afford like readings, the one will be arranged to read to the right, while the other will be arranged to read to the left, to afford readings in a direct manner in the reversed operation of the instrument. With the described arrangement measurements of one-thousandth of an inch, will be read on one of said scales, and like measurements will be read on the other of said scales, while measurements of one ten-thousandth of an inch, will be read in both of said instances on the vernier portion 26, 27 of the scale on the headstock 23, in conjunction with the scale 34 on the revoluble sleeve 25.

After an initial turning adjustment of the micrometer mechanism has been effected and the parts clamped in the desired position by the clamping nut 40, above described, the collar 30 carrying the scale 34 will require adjustment in one direction or the other in order to bring its zero mark in register with the zero mark of the scale 26, 27 on the stationary headstock 23, after which said collar 30, is fastened to the sleeve 25 by the set screw 31. The other scale 41, 42 need no such adjustment in that the carrying members thereof turn together when the above described turning adjustment of the micrometer mechanism is made.

The operative connection between the tubular head 28 and the micrometer screw 35 heretofore referred to, will preferably comprise an internally screw threaded bushing 43 fixed in the tubular end of the head 28 and having operative engagement with the micrometer screw 35, and an auxiliary sleeve nut 44 arranged in longitudinally spaced relation to said bushing 43 and having individual operative engagement with the micrometer screw 35. The auxiliary sleeve nut 44 is adapted to have longitudinal adjustment in relation to the bushing in order to take up any lost motion or play between the screw threads of the parts, by means of an adjusting nut 45 turning on a screw threaded portion of the periphery of the bushing 43 and having bearing against the auxiliary nut 44 as shown. Independent turning movement between the bushing 43 and the auxiliary nut 44 is prevented by a key 46 on one part moving in a longitudinal key way 47 in the other part, as illustrated in Figs. 4 and 5.

The various rotary sleeve and nuts of the micrometer mechanism above described, will be provided with capstan orifices or other similar provision in their perimeters for convenient positive adjustment by a capstan bar or wrench usually employed in like adjusting operations.

In the adaptation of the instrument to obtaining measurements of different articles, various auxiliary parts and attachments will be used, many of which are described in detail in my aforesaid prior application Serial No. 431,983, and in addition to such prior disclosures other attachments are used with the present instrument, as follows:—

In Fig. 9, an adaptation of the instrument is shown as a micrometer screw thread tool gauge. In this the respective measuring jaws 6 and 7 carry individual removable heads 48, 49, which fit over and are rigidly clamped on the shank portions of the respective jaws, with their adjacent ends formed with opposed inclined surfaces 48' and 49' to constitute an approximately V shaped gauge channel in which the cutter for forming V shaped screw threads may be accurately gauged, with the standard amount of flat portion at the point or apex of the V shaped end of the tool accurately obtained by a bottom ledge or shelf 50 on one of said heads arranged to have a sliding movement beneath the companion head, as shown, with the extent of said flat portion attained and indicated by the operation of the associated micrometer mechanism of the instrument.

In Fig. 10, an adaptation of the instrument is shown as a micrometer divider, compass scriber, and is substantially the same in construction and operation as that set forth in my aforesaid application, Ser. No. 431,983.

In Figs. 11 and 12, an adaptation of the instrument is shown to work bench and like uses, and comprises a pair of end standards 51, each carrying on its upper end a vertical stud 52 for supporting engagement in an end orifice 5 of the main staff or rail 1, as set forth in my aforesaid prior application, Serial No. 431,983. In addition thereto, each standard 51 will be formed near its upper end with a horizontal orifice for the reception of a revoluble arbor 53, which is split at one end to provide holding jaws 54 between which an end of the staff or rail 1 is gripped and held. The other end of the arbor 53 is screw threaded for the reception of a clamping nut 55. In the described construction the middle part 56 of the arbor 53 is of a conical shape, with its upper and lower portions of such conical part cut away as shown in Fig. 11, with a view to avoid binding of the parts in actual use. In conjunction with the above described conical part 56 of the arbor 53, the end portion of the horizontal orifice in a standard 51, in which said conical part 56 has bearing, is of a conical form, with said formation adapted to force the arbor jaws 54 together upon the staff or rail 1, when the clamping nuts 55 are operated to draw the described cone formations of the parts together. Coincident therewith a frictional locking together of said parts is attained to prevent any independent turning of the arbor and parts attached thereto in relation to a standard 51.

With the described construction the measuring instrument is supported upon a work bench or the like, in a convenient position for manipulation and reading, and may be turned and set to any desired position adapted to the most convenient relation for the reading of its scales and the measurements attained.

In Fig. 13, an adaptation of the instrument as a height gauge, is shown, and is substantially the same as the construction set forth in my prior application Serial No. 431,983, with the difference in the present construction that the auxiliary measuring jaw 57 is connected to the main travelling jaw 6 of the instrument, by means of a carrier of an offset form and comprising upper and lower attaching rails 58, 58 integrally connected by a vertical web 59, with the upper rail attached to the main measuring jaw 6 of the instrument by a clamping sleeve 60 and said lower rail attached to the auxiliary measuring jaw 57 by a clamping sleeve 61 as shown.

Such special construction is adapted to permit of a close initial relation of the auxiliary measuring or scribing jaw 57, to the top of a surface plate upon which the instrument is mounted, and thereby attain comparatively small measurements. In this adaptation the staff or rail 1 of the instrument is fixedly secured in vertical or upright position in a supporting base 62, in which it is detachably secured by a horizontal screw clamping device 63, illustrated in detail in Figs. 14, 15 and 16.

With the above described association of parts, the instrument is adapted for use either as a height or as a depth gauge, with the base 62 taking the place of the stationary jaw 7 of the instrument, and in such substitution of parts the micrometer mechanism is first set to a zero reading, as illustrated in Fig. 1, and its clamping screw 11 then tightened. The stationary jaw 7 of the instrument is removed and the end of the main staff or rail 1 is inserted in said base 62 with the bottom surface of the travelling measuring jaw 7 resting upon the top surface of said base, after which the staff or rail 1, is fixedly secured in place in the base by the fastening means 63 aforesaid.

With the work, on which "laying out" is to be performed, resting on a surface on the same plane as the supporting base 62, the extension or carrier 58, 59, and its clamping sleeves 60 are employed to bring the scribing jaw or member 57 near to the surface on which the work rests, when however said work is supported on parallels equal in height to that of the supporting base 62, minus the height of the scribing jaw 57, said scribing jaw may be secured directly to the main travelling jaw 6 of the instrument. As the work, with the face upon which the "laying out" is to be performed in ascertaining straight outline, centers or radii of openings, bushings, etc. in dies and jigs, is supported in a vertical plane, and usually by a supporting angle plate if too light to support itself, the operation may be performed in either an upward or a downward direction preferably however in a downward direction, with the micrometer mechanism set to an abutment recess 2 along the staff or rail 1 and at a height which will admit said mechanism to be set so that the under edge of scriber 57 passes over the work and touching its edge, after which the reading of the micrometer mechanism is taken. The distance between said top edge of the work and the first line is added, and the instrument is set to such dimension, after which the clamping screw 11 is tightened and the line scribed upon the work. The distance of the next line to be scribed is then added further adjustment of the micrometer mechanism made and the line scribed, and so on until all the lines desired are scribed one way. The work is then turned with its bottom edge in a vertical plane, and the desired lines scribed thereon in a manner similar to that above described. Arcs and circles may then be scribed on the work by the other attachments to the instrument, heretofore described.

When said association of parts is used in "checking up" and measuring depths of openings or recesses in an article, as well as in measuring the height or the difference in height between the projections of parts in or on a die or like article as well as in setting work on a milling machine or the like, the contact indicating attachment described in detail in my former application for Patent Ser. No. 431,983, may be used. Such attachment with its adjustable contact pole or rod, when used in the present connection, may be secured directly to the main travelling jaw 6 of the instrument, or to an interposed straight extension bar in order to attain greater reach, as shown and described in said former application. And the readings of the instrument should be taken when the index finger or pointer of such attachment registers with the associated zero or limit mark.

Having thus fully described my invention what I claim as new and desire to secure by Letters Patent is:—

1. In an instrument of the type described, a main staff provided with a longitudinally arranged scale, a normally stationary jaw, means for securing said jaw to said staff, a micrometer mechanism having a carriage slidingly mounted on said staff, means on the micrometer carriage for engaging the main staff at predetermined distances along the same, means for simultaneously forcing the said engaging means and the said micrometer carriage into close contact with the main staff, and a travelling jaw having a carriage slidingly mounted on said staff and operatively connected to said micrometer mechanism.

2. In an instrument of the type described, a main staff provided with a longitudinally arranged scale and a series of spaced recesses in its edge corresponding with equal divisions of said scale, a normally stationary jaw, means for securing said jaw to said staff, a micrometer mechanism having a carriage slidingly mounted on said staff, means for locking the micrometer carriage at points along the staff, said means comprising a latch bar movable on said carriage and adapted to engage any of the recesses in said staff, and means for forcing said latch bar into close contact with the remote wall of either of said recesses, and a travelling jaw having a carriage slidingly mounted on said staff and operatively connected to said micrometer mechanism.

3. In an instrument of the type described, a main staff provided with a longitudinally arranged scale, a series of spaced holding recesses in one edge and a series of socket recesses in the other edge, a normally stationary jaw, means for securing said jaw to said staff, a micrometer mechanism having a carriage slidingly mounted on said staff, means for locking the micrometer carriage at points along the staff, said means comprising a latch piece slidable transversely in said carriage and adapted to engage in any one of the holding recesses aforesaid, a yoke member pivoted at one end to said carriage and provided at its other end with a set screw the point of which is adapted to engage in any one of the aforesaid socket recesses, and a travelling jaw having a carriage slidingly mounted on said staff and operatively connected to said micrometer mechanism.

4. In an instrument of the type described, a main staff provided with a longitudinally arranged scale and a series of spaced rectangular shaped recesses in its edge corresponding with equal divisions of said scale, a normally stationary jaw, means for securing said jaw to said staff, a micrometer mechanism having a carriage slidingly mounted on said staff, means for locking the micrometer carriage at points along the staff, said means comprising a latch bar movable on said carriage and adapted to engage any one of the recesses in said staff, and means for forcing said latch bar into close contact with the remote wall of any one of said recesses, and a travelling jaw having a carriage slidingly mounted on said staff and operatively connected to said micrometer mechanism.

5. In an instrument of the type described, a main staff provided with a longitudinally arranged scale, a normally stationary jaw, means for securing said jaw to said staff, a micrometer mechanism, a carriage for said mechanism slidingly mounted on said staff, means for clamping said carriage to said staff, said micrometer mechanism comprising a tubular headstock secured to the aforesaid carriage, a revoluble sleeve mounted for rotation in said headstock, a micrometer screw having fixed axial attachment in said sleeve, a tubular head sliding in said sleeve and having screw threaded engagement with the micrometer screw, the aforesaid sleeve, headstock and tubular head carrying a plurality of scales reading in opposite directions, a travelling jaw having a carriage slidingly mounted on the main staff, and means for attaching said tubular head to the travelling jaw in a manner permitting a turning adjustment of the tubular head.

6. In an instrument of the type described, a main staff provided with a longitudinally arranged scale, a normally stationary jaw, means for securing said jaw to said staff, a micrometer mechanism, a carriage for said mechanism slidingly mounted on said staff, means for clamping said carriage to said staff, said micrometer mechanism comprising a tubular headstock secured to the aforesaid carriage, a revoluble sleeve mounted for rotation in said headstock, a micrometer screw having fixed axial attachment in said sleeve, a tubular head sliding in said sleeve and having screw threaded engagement with the micrometer screw, the aforesaid sleeve, headstock and tubular head carrying a plurality of scales reading in opposite directions, a travelling jaw having a carriage slidingly mounted on the main staff, and means for attaching said tubular head to the travelling jaw in a manner permitting a turning adjustment of the tubular head, the same comprising an orificed lug on the travelling jaw, a reduced shank in the end of the tubular head, and a clamping nut engaging a screw threaded portion of said shank.

7. In an instrument of the type described, a main staff provided with a longitudinally arranged scale, a normally stationary jaw, means for securing said jaw to said staff, a micrometer mechanism, a carriage for said mechanism slidingly mounted on said staff, means for clamping said carriage to said staff, said micrometer mechanism comprising a tubular headstock secured to the aforesaid carriage, a revoluble sleeve mounted for rotation in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, and a travelling jaw slidingly mounted on the main staff and having fixed connection with said tubular head.

8. In an instrument of the type described, a main staff provided with a longitudinally arranged scale, a normally stationary jaw, means for securing said jaw to said staff, a micrometer mechanism, a carriage for said mechanism slidingly mounted on said staff, means for clamping said carriage to said staff, said micrometer mechanism comprising a tubular headstock secured to the aforesaid carriage, a revoluble sleeve mounted for rotation in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, a travelling jaw having a carriage slidingly mounted on the main staff, and means for attaching said tubular head to the travelling jaw in a manner permitting a turning adjustment of the tubular head.

9. In an instrument of the type described, a main staff provided with a longitudinally arranged scale, a normally stationary jaw, means for securing said jaw to said staff, a micrometer mechanism, a carriage for said mechanism slidingly mounted on said staff, means for clamping said carriage to said staff, said micrometer mechanism comprising a tubular headstock secured to the aforesaid carriage, a revoluble sleeve mounted for rotation in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, a travelling jaw having a carriage slidingly mounted on the main staff, and means for attaching said tubular head to the travelling jaw in a manner permitting a turning adjustment of the tubular head, the same comprising an orificed lug on the travelling jaw, a reduced shank on the end of the tubular head, and a clamping nut engaging a screw threaded portion of said shank.

10. In an instrument of the type described a main staff provided with a longitudinally arranged scale and a series of locking recesses corresponding with equal divisions of said scale, a normally stationary jaw, means for securing said jaw to said staff, a micrometer mechanism, a carriage for said mechanism adjustably mounted in said staff, a locking bar on said carriage adapted for engagement in the locking recesses of the main staff, said micrometer mechanism comprising a tubular headstock secured to said carriage, a revoluble sleeve mounted in said headstock, a micrometer screw having fixed axial attachment in said sleeve, a tubular head sliding in said sleeve and having screw threaded engagement with the micrometer screw, the aforesaid sleeve, headstock and tubular head carrying a plurality of scales reading in opposite directions, a travelling jaw having a carriage slidingly mounted on the main staff, and means for attaching said tubular head to the travelling jaw in a manner permitting a turning adjustment of the tubular head.

11. In an instrument of the type described, a main staff provided with a longitudinally arranged scale and a series of locking recesses corresponding with equal divisions of said scale, a normally stationary jaw, means for securing said jaw to said staff, a micrometer mechanism, a carriage for said mechanism adjustably mounted on said staff, a locking bar on said carriage adapted for engagement in the locking recesses of the main staff, said micrometer mechanism comprising a tubular headstock secured to said carriage, a revoluble sleeve mounted in said headstock, a micrometer screw having fixed axial attachment in said sleeve, a tubular head sliding in said sleeve and having screw threaded engagement with the micrometer screw, the aforesaid sleeve, headstock and tubular head carrying a plurality of scales reading in opposite directions, a travelling jaw having a carriage slidingly mounted on the main staff, and means for attaching said tubular head to the travelling jaw in a manner permitting a turning adjustment of the tubular head, the same comprising an orificed lug on the travelling jaw, a reduced shank on the end of the tubular head, and a clamping nut engaging a screw threaded portion of said shank.

12. In an instrument of the type described, a main staff provided with a longitudinally arranged scale and a series of locking recesses corresponding with equal divisions of said scale, a normally stationary jaw, means for securing said jaw to said staff, a micrometer mechanism, a carriage for said mechanism adjustably mounted on said staff, a locking bar on said carriage adapted for engagement in the locking recesses of the main staff, said micrometer mechnism comprising a tubular headstock secured to said carriage, a revoluble sleeve mounted in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, and a travelling jaw slidingly mounted on the main staff and having fixed connection with said tubular head.

13. In an instrument of the type described, a main staff provided with a longitudinally arranged scale and a series of locking recesses corresponding with equal divisions of said scale, a normally stationary jaw, means for securing said jaw to said staff, a micrometer mechanism, a carriage for said mechanism adjustably mounted on said staff, a locking bar on said carriage adapted for engagement in the locking recesses of the main staff, said micrometer mechanism comprising a tubular headstock secured to said carriage, a revoluble sleeve mounted in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, a travelling jaw having a carriage slidingly mounted on the main staff, and means for attaching said tubular head to the travelling jaw in a manner permitting a turning adjustment of the tubular head.

14. In an instrument of the type described, a main staff provided with a longitudinally arranged scale and a series of locking recesses corresponding with equal divisions of said scale, a normally stationary jaw, means for securing said jaw to said staff, a micrometer mechanism, a carriage for said mechansim adjustably mounted on said staff, a locking bar on said carriage adapted for engagement in the locking recesses of the main staff, said micrometer mechanism comprising a tubular headstock secured to said carriage, a revoluble sleeve mounted in said headstock, a micrometer screw having fixed axial attachment in said sleeve, a tubular head sliding in said sleeve and having screw threaded engagement with the micrometer screw, an auxiliary screw threaded sleeve arranged on the micrometer screw and having non-rotative key way connection with the tubular head, an adjusting nut between said tubular head and said auxiliary sleeve, a travelling jaw having a carriage slidingly mounted on the main staff, and means for attaching said tubular head to the travelling jaw in a manner permitting a turning adjustment of the tubular head, the same comprising an orificed lug on the travelling jaw, a reduced shank on the end of the tubular head, and a clamping nut engaging a screw threaded portion of said shank.

15. In a measuring instrument of the type described, and in which the micrometer measuring means are carried on a main staff, the combination of a main staff, a pair of supporting standards, and a pair of revoluble arbors mounted horizontally in said standards with an end of each arbor formed for holding engagement with an end of the main staff aforesaid.

Signed at Chicago, Illinois, this 31st day of May 1924.

GEORGE SCHUSTARICH.